US011321950B2

(12) United States Patent
Lee

(10) Patent No.: US 11,321,950 B2
(45) Date of Patent: May 3, 2022

(54) APPARATUS AND METHOD FOR DETECTING LANE INFORMATION, AND COMPUTER-READABLE RECORDING MEDIUM STORING COMPUTER PROGRAM PROGRAMMED TO EXECUTE SAME METHOD

(71) Applicant: SK TELECOM CO., LTD., Seoul (KR)

(72) Inventor: Seong Soo Lee, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 17/057,498

(22) PCT Filed: May 24, 2019

(86) PCT No.: PCT/KR2019/006278
§ 371 (c)(1),
(2) Date: Nov. 20, 2020

(87) PCT Pub. No.: WO2020/004817
PCT Pub. Date: Jan. 2, 2020

(65) Prior Publication Data
US 2021/0365694 A1 Nov. 25, 2021

(30) Foreign Application Priority Data
Jun. 26, 2018 (KR) .................. 10-2018-0073259

(51) Int. Cl.
*H04N 7/18* (2006.01)
*G06V 20/56* (2022.01)
(Continued)

(52) U.S. Cl.
CPC .......... *G06V 20/588* (2022.01); *B60W 30/12* (2013.01); *B60W 40/04* (2013.01); *B60W 40/076* (2013.01); *B60W 2420/42* (2013.01)

(58) Field of Classification Search
CPC ...... B60W 30/12; B60W 40/04; B60W 40/02; B60W 40/076; B60W 2420/42; G06K 9/00798; G06K 9/00; G08G 1/16
(Continued)

(56) References Cited

U.S. PATENT DOCUMENTS

2014/0306844 A1* 10/2014 Kim .................... G01S 13/867
342/385

FOREIGN PATENT DOCUMENTS

| CN | 110920614 A | * | 3/2020 |
| JP | 2007-004669 A | | 1/2007 |

(Continued)

OTHER PUBLICATIONS

PCT International Search Report and Written Opinion, PCT Application No. PCT/KR2019/006278, dated Aug. 29, 2019, 10 pages (with English translation of PCT International Search Report).

*Primary Examiner* — Robert Chevalier
(74) *Attorney, Agent, or Firm* — Fenwick & West LLP

(57) ABSTRACT

In accordance with an aspect of the present disclosure, there is provided a method for detecting a lane information comprising: obtaining, from a high definition map, first driving lane information corresponding to estimated position information on a vehicle; obtaining second driving lane information from a front view image from the vehicle captured by a camera installed in the vehicle; converting the first driving lane information and the second driving lane information according to an identical coordinate system; and obtaining final driving lane information by combining the
(Continued)

converted first driving lane information and the converted second driving lane information.

20 Claims, 14 Drawing Sheets

(51) Int. Cl.
*B60W 30/12* (2020.01)
*B60W 40/04* (2006.01)
*B60W 40/076* (2012.01)

(58) Field of Classification Search
USPC ............... 348/148, 143, 149, 151, 159, 135
See application file for complete search history.

(56) References Cited

FOREIGN PATENT DOCUMENTS

| | | | | |
|---|---|---|---|---|
| JP | 2008-165326 | A | | 7/2008 |
| JP | 103853155 | A | * | 6/2014 |
| KR | 10-2009-0064946 | A | | 6/2009 |
| KR | 10-2014-0071174 | A | | 6/2014 |
| KR | 10-2015-0074750 | A | | 7/2015 |

* cited by examiner

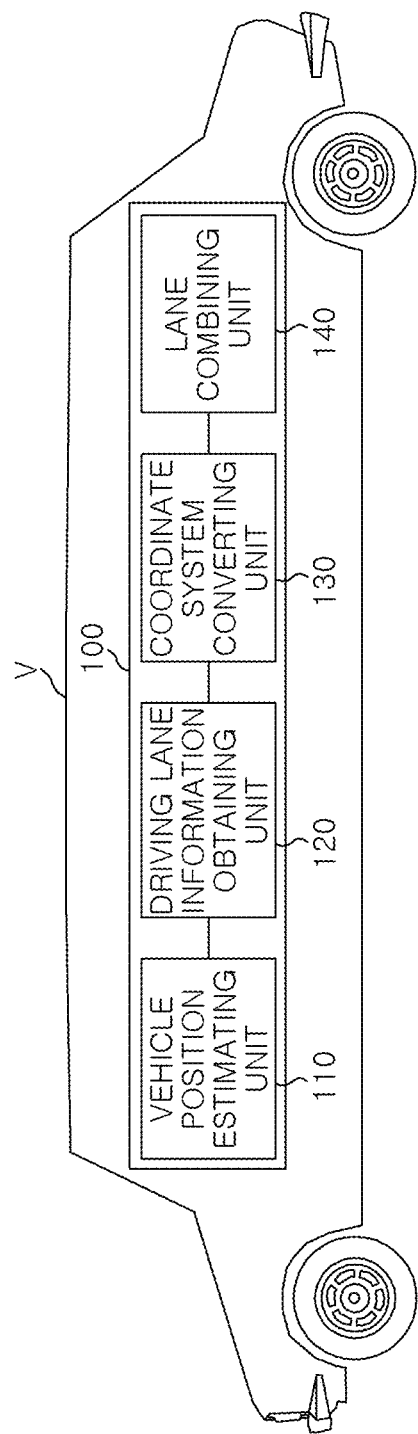

APPARATUS AND METHOD FOR DETECTING LANE INFORMATION, AND COMPUTER-READABLE RECORDING MEDIUM STORING COMPUTER PROGRAM PROGRAMMED TO EXECUTE SAME METHOD

CROSS-REFERENCE TO RELATED APPLICATION

Pursuant to 35 U.S.C. § 119(a), this application claims the benefit of the earlier filing date and the right of priority to Korean Patent Application No. 10-2018-0073259, filed on Jun. 26, 2018, the contents of which is incorporated by reference herein in its entirety.

TECHNICAL FIELD

The present disclosure relates to a lane information detecting apparatus, method, and a computer-readable recording medium storing a computer program programmed to execute the method.

BACKGROUND

In general, a vehicle means a transportation machine driving roads or tracks using fossil fuel, electricity, and the like as a power source.

The vehicle has been developed to provide various functions to a driver according to development of technology. Particularly, according to the trend of vehicle electrification, a vehicle with an active safety system (ASS) that operates to prevent an accident immediately before or at the time of the accident has appeared.

Further, in recent years, to alleviate burdens on the driver and enhance convenience, researches into a vehicle with an advanced driver assistance system (ADAS) that actively provides information on a driving environment, such as vehicle condition, a driver's condition, and a surrounding environment, and the like are being actively conducted.

Among the advanced driver assistance systems, a lane departure warning system (LDWS) and a lane keeping assist system (LKAS) may obtain driving lane information from a front view image from the vehicle and may control driving of the vehicle by using the obtained driving lane information.

At this time, if it is difficult to obtain the driving lane information from the front view image due to environmental factors such as weather, or if part of the lane markings doesn't exist on an actual road, performances of the lane departure warning system and the lane keeping assist system may be deteriorated.

SUMMARY

The problem to be solved by the present disclosure is to provide a technology for detecting driving lane information more precisely than conventional technologies.

Further, the problem to be solved by the present disclosure is to provide a technology that may precisely detect the driving lane information even if it is difficult to obtain the driving lane information from a front-view image from a vehicle due to an environmental factor such as weather, or even if part of the lane markings doesn't exist on an actual road.

Furthermore, the problem to be solved by the present disclosure is to apply the technology proposed in the present disclosure to various vehicles, for example, a vehicle adopting an advanced driver assistance system.

However, the problem to be solved by the present disclosure is not limited to those mentioned above, and another problem, not mentioned above, to be solved may be clearly understood by those skilled in the art from the following description.

In accordance with one aspect of the present disclosure, there is provided a method for detecting a lane information comprising: obtaining, from a high definition map, first driving lane information corresponding to estimated position information on a vehicle; obtaining second driving lane information from a front view image from the vehicle captured by a camera installed in the vehicle; converting the first driving lane information and the second driving lane information according to an identical coordinate system; and obtaining final driving lane information by combining the converted first driving lane information and the converted second driving lane information.

In accordance with another aspect of the present disclosure, there is provided a non-transitory computer-readable recording medium storing computer program to perform a lane information detecting method comprising: obtaining, from a high definition map, first driving lane information corresponding to estimated position information on a vehicle; obtaining second driving lane information from a front view image from the vehicle captured by a camera installed in the vehicle; converting the first driving lane information and the second driving lane information according to an identical coordinate system; and obtaining final driving lane information by combining the converted first driving lane information and the converted second driving lane information.

In accordance with still another aspect of the present disclosure, there is provided an apparatus for detecting a lane information comprising: a driving lane information obtaining unit configured to obtain, from a high definition map, first driving lane information corresponding to estimated position information on a vehicle, and obtain second driving lane information from a front view image from the vehicle captured by a camera installed in the vehicle; a coordinate system converting unit configured to convert the first driving lane information and the second driving lane information according to an identical coordinate system; and a lane combining unit configured to obtain final driving lane information by combining the converted first driving lane information and the converted second driving lane information.

According to the aspects of the present disclosure, a lane information detecting apparatus, method, and a computer-readable recording medium storing a computer program programmed to execute the method may detect more precise driving lane information by using a high definition map as well as the front view image from the vehicle.

Further, by using the detected driving lane information as an input value of the lane departure warning system and the lane keeping assist system, more precise control over the vehicle may be possible.

BRIEF DESCRIPTION OF THE DRAWINGS

FIGS. 1A and 1B show a control block diagram of a lane information detecting system according to various embodiments.

DETAILED DESCRIPTION

The advantages and features of exemplary embodiments of the present disclosure and methods of accomplishing them will be clearly understood from the following description of the embodiments taken in conjunction with the accompanying drawings. However, the present disclosure is not limited to those embodiments and is implemented in various forms. It is noted that the embodiments are provided to make a full disclosure and also to allow those skilled in the art to know the full scope of the present disclosure.

In the following description, well-known functions and/or configurations will not be described in detail if they would unnecessarily obscure the features of the disclosure. Further, the terms to be described below are defined in consideration of their functions in the embodiments of the disclosure and vary depending on a user's or operator's intention or practice. Accordingly, the definition is made on a basis of the content throughout the present disclosure.

Figure 1A:
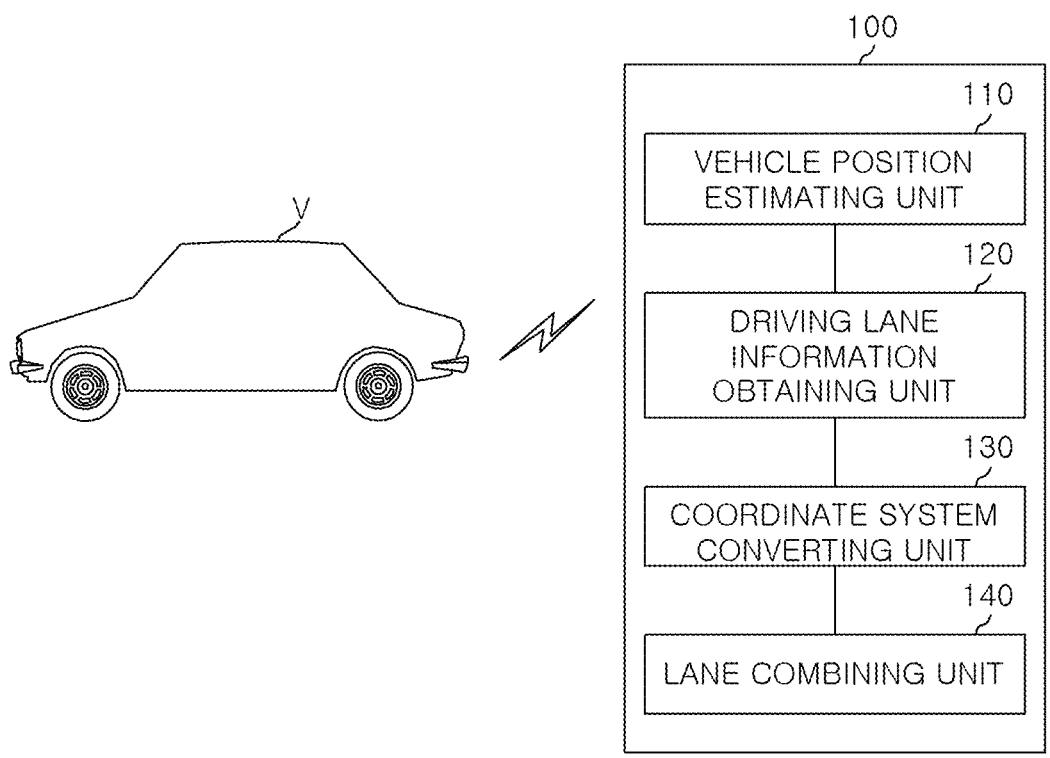
Figure 2:
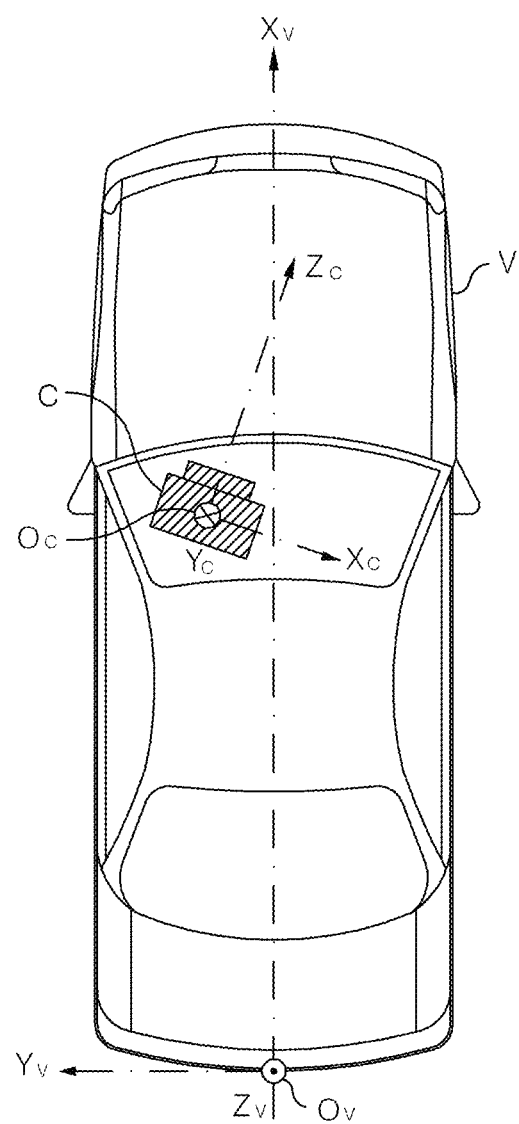
FIG. 2 shows a diagram illustrating a vehicle coordinate system and a camera coordinate system according to one embodiment.
Figure 3:
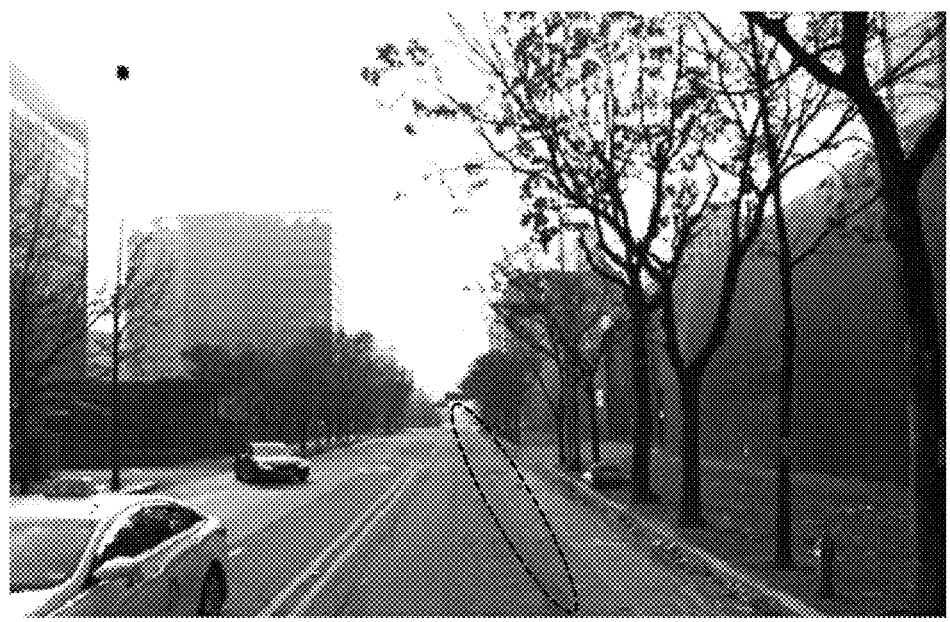
FIG. 3 shows a diagram illustrating a front view image where part of driving lane markings doesn't exist according to one embodiment.

FIGS. 1A and 1B shows a control block diagram of a lane information detecting system according to various embodiments, FIG. 2 shows a diagram illustrating a vehicle coordinate system and a camera coordinate system according to one embodiment, and FIG. 3 shows a diagram illustrating a front view image where part of driving lane markings doesn't exist according to one embodiment.

Referring to FIG. 1A, the lane information detecting system according to one embodiment may include a vehicle V and a lane information detecting apparatus 100.

The vehicle V may indicate a transportation means capable of moving humans, objects, or animals from one location to another while driving along a road or a track.

The vehicle V according to one embodiment may include a vehicle with three wheels or a vehicle with four wheels, a vehicle with two wheels such as a motorcycle, a construction machine, a motor bicycle, a bicycle, and a train running on a track, and the like.

The vehicle V of FIG. 1A is equipped with a global position system (GPS) module, and thus may receive a satellite signal including navigation data from at least one GPS satellite. The vehicle V may obtain a GPS-based current location of the vehicle V and a driving direction of the vehicle V based on the satellite signal.

Further, the vehicle V of FIG. 1A may store a high definition map in advance. Herein, the high definition map may indicate a map that has high accuracy for safe and precise control over the vehicle V, and includes information on an altitude, slope, curvature, and the like, as well as a plane position of the road.

In addition, the high definition map is a map in which at least lane markings are separately displayed, and may further include road facilities such as road signs, traffic lights, a guardrail, and the like.

The high definition map includes a point cloud, which is a set of a plurality of points obtained by scanning a road through a laser scanner or the like, and each point included in the point cloud may have three-dimensional spatial coordinates on a reference coordinate system. The obtained point cloud may filter meaningful data through a noise filter, and the high definition map may be constructed by marking landmarks on each point cloud.

Herein, the reference coordinate system may indicate an orthogonal coordinate system independent of a device, and may include a world coordinate system.

Further, the high definition map may be stored in the lane information detecting apparatus 100 to be described later in addition to the vehicle V.

In addition, the vehicle V of FIG. 1A may be equipped with an advanced driver assistance system (ADAS). Herein, the advanced driver assistance system may indicate a system that provides information on a driving environment such as condition of the vehicle V, condition of a driver, and surrounding environment information or actively controls the vehicle V to reduce a burden on the driver and enhance convenience.

For example, the vehicle V may be equipped with at least one of a lane departure warning system (LDWS) and a lane keeping assist system (LKAS). However, the advanced driver assistance system mounted on the vehicle V is not limited to those described above.

The advanced driver assistance system mounted on the vehicle V may include a sensing means for detecting the driving environment of the vehicle V. The sensing means according to one embodiment may include radar that detects the driving environment by emitting a pulse around the vehicle V and receiving an echo pulse reflected from an object positioned in a corresponding direction, LiDAR that emits a laser around the vehicle V and receives an echo laser reflected from an object positioned in a corresponding direction, and/or an ultrasonic sensor that emits an ultrasonic wave around the vehicle V and receives an echo ultrasonic wave reflected from an object positioned in a corresponding direction, and the like.

In addition, the advanced driver assistance system may include a camera C as the sensing means. The camera C may be installed to face the front, the side, and/or the rear of the vehicle V, and thus may capture an image in a corresponding direction. The captured image may be a basis for obtaining information such as a lane marking or a road sign, as well as an object around the vehicle V through image processing.

Hereinafter, for convenience of description, it is assumed that the camera C is installed to face the front of the vehicle V and obtains an image of an area in front of the vehicle.

On the other hand, the vehicle V may combine, to control the vehicle V, image information obtained by the camera C and CAN (controller area network) DATA such as wheel rotation information and yaw rate information transmitted through a CAN communication method, which is a communication method between internal modules of the vehicle V. At this time, while the front view image obtained by the camera C follows the camera coordinate system, the CAN DATA may follow the vehicle coordinate system.

FIG. 2 illustrates the coordinate system of the vehicle V and the coordinate system of the camera C installed in the vehicle V as a rough floor plan of the vehicle V according to one embodiment. Referring to FIG. 2, the vehicle V may have the vehicle coordinate system including an $O_V$ as an origin, an $X_V$ axis in the driving direction of the vehicle V, a $Z_V$ axis in a vertical direction from ground, and a $Y_V$ axis perpendicular to the $X_V$ axis and the $Z_V$ axis. On the other hand, the camera C installed in the vehicle V may have the camera coordinate system including an $O_C$ as an origin, and an $X_C$ axis, a $Y_C$ axis, and a $Z_C$ axis, which are determined by a position of installation and an orientation angle. In order to combine two pieces of information each on a different coordinate system, unification of the coordinate systems is required, which is called camera calibration.

To this end, the camera calibration may be performed before the vehicle V is driven. Specifically, a recognition pattern image for correction may be obtained by using the camera C installed in the vehicle V, and the orientation angle and the position at which the camera C is installed may be manually obtained by using the obtained recognition pattern image. As another example, a lane marking may be recognized through the camera C while driving of the vehicle V, and the orientation angle of the camera C may be obtained by identifying a position of a vanishing point based on the recognized lane.

Alternatively, the lane information detecting apparatus 100 of the lane information detecting system may perform the camera calibration in real time. This will be described later.

Referring to FIG. 1A again, the lane information detecting apparatus 100 according to one embodiment may estimate position information on the vehicle V by using information received from the vehicle V, and may obtain driving lane information on the vehicle V based on the estimated position information on the vehicle V. Herein, the position information may include a position and an orientation angle, and the driving lane information may include a derivative value of curvature, the curvature, a direction, and an offset value of a detected driving lane marking.

In order to obtain the driving lane information, the lane information detecting apparatus 100 may exchange information by communicating with the vehicle V in various publicly known communication methods. The lane information detecting apparatus 100 according to one embodiment may communicate with the vehicle V through a base station by adopting a publicly known communication method such as CDMA, GSM, W-CDMA, TD-SCDMA, WiBro, LTE, EPC, and the like. Alternatively, the lane information detecting apparatus 100 according to another embodiment may communicate with the vehicle V within a predetermined distance by adopting a communication method such as a wireless LAN, Wi-Fi, Bluetooth, Zigbee, Wi-Fi Direct (WFD), Ultra-Wide Band (UWB), Infrared Data Association (IrDA), Bluetooth Low Energy (BLE), and Near Field Communication (NFC), and the like. However, the method in which a communication unit communicates with the vehicle V is not limited to the embodiments described above.

The lane information detecting apparatus 100 may obtain, by using the information received from the vehicle V, first driving lane information based on the high definition map and second driving lane information based on the front view image from the vehicle, and may obtain final driving lane information by combining the first driving lane information and the second driving lane information based on the vehicle coordinate system.

To this end, the lane information detecting apparatus 100 may include a vehicle position estimating unit 110 that obtains the estimated position information on the vehicle V; a driving lane information obtaining unit 120 that obtains the driving lane information on the vehicle; a coordinate system converting unit 130 that converts the obtained driving lane information according to the vehicle coordinate system; and a lane combining unit 140 that combines the converted driving lane information and obtains the final driving lane information.

On the other hand, FIG. 1A illustrates a case in which the lane information detecting apparatus 100 included in the lane information detecting system is provided separately from the vehicle V, however, alternatively, the lane information detecting apparatus 100 may be included in the vehicle V as a component of the vehicle V.

Referring to FIG. 1B, the lane information detecting system according to another embodiment may include a vehicle V including the lane information detecting apparatus 100. However, except for a way in which the lane information detection apparatus 100 is provided, the operations of the lane information detecting system of FIG. 1A and the lane information detecting system of FIG. 1B are the same.

On the other hand, as one embodiment of a lane information detecting method, the front view image from the vehicle V may be used. For example, when the front view image is obtained by the camera C installed in the vehicle V, a center lane in the front view image may be determined as a driving lane, and lane markings of both sides of the driving lane may be determined as the driving lane markings. Each of the determined driving lane markings may be converted according to the vehicle coordinate system, and the driving lane information may be obtained by using a result of the conversion.

Referring to FIG. 3, if the center lane in the front view image captured by the camera C is the driving lane, both lane markings on a left side and a right side of the driving lane may be the driving lane markings. In FIG. 3, it is illustrated that a centerline positioned on the left side of the driving lane is a left driving lane marking.

However, it may be identified from the front view image that a lane marking on the right side of the driving lane, that is a right driving lane marking doesn't exist in an area indicated by the dotted line. As a cause of this phenomenon, part of the driving lane markings may not have been captured due to environmental factors such as weather in a course of the front view image being captured by the camera C, or part of the driving lane markings may have been erased on an actual road.

As illustrated in FIG. 3, since there is a possibility that all or part of the driving lane markings do not exist in the front view image, the driving lane information obtained by using the front view image may have low accuracy. Therefore, the lane information detecting apparatus 100 according to one embodiment of the present disclosure may obtain more accurate driving lane information by using the high definition map together with the front view image.

Referring to FIG. 1A again, the vehicle position estimating unit 110 may obtain the estimated position information on the vehicle V. To this end, the vehicle position estimating unit 110 may estimate the position information on the vehicle V by matching the front view image captured by the camera C with the landmark on the high definition map.

Accurate position information on the camera C may be required for the matching of the front view image and the high definition map, and since the coordinate system of the vehicle V and the coordinate system of the camera C may be set differently as described above, conversion of the coordinate system may be performed. In addition, since GPS-based initial position information on the vehicle V may be inaccurate in an area where high-rise buildings are densely concentrated, the camera calibration may be performed before estimating the position of the vehicle V.

The vehicle position estimating unit 110 may perform the camera calibration by using the GPS-based initial position information on the vehicle V. First, the vehicle position estimating unit 110 may obtain the GPS-based initial position information on the vehicle V determined based on the satellite signal. The vehicle position estimating unit 110 according to one embodiment may receive, from the vehicle V, the initial position information including a GPS-based initial position and an initial orientation angle of the vehicle V. Alternatively, the vehicle position estimating unit 110 according to another embodiment may receive, from the vehicle V, the GPS-based initial position of the vehicle V, and may obtain the initial position information including the initial orientation angle of the vehicle V by using the initial position.

When the GPS-based initial position of the vehicle V is received from the vehicle V, the vehicle position estimating unit 110 may obtain the initial orientation angle of the vehicle V by using the GPS-based initial position of the vehicle V. Specifically, the vehicle position estimating unit 110 may obtain the $X_V$ axis indicating the driving direction of the vehicle V based on the GPS-based initial positions of the vehicle V which are received repeatedly, and the $Z_V$ axis in the vertical direction from the ground which is determined by the lane markings on the high definition map, and then may obtain the $Y_V$ axis by performing a cross product of the $X_V$ axis and the $Z_V$ axis. Further, considering a possibility that the $X_V$ axis and the $Y_V$ axis previously obtained may not be perpendicular to each other because of an error inherent in the satellite signal, the vehicle position estimating unit 110 may correct the $X_V$ axis by performing a cross product of the $Y_V$ axis and the $Z_V$ axis.

Through those described above, the vehicle position estimating unit 110 may obtain three-dimensional coordinates that represent the initial position of the camera C and a three-dimensional coordinate axis that is the initial orientation angle of the camera C.

Then, the vehicle position estimating unit 110 may determine, on the high definition map, a first interest area based on the GPS-based initial position information on the vehicle V. Specifically, the vehicle position estimating unit 110 may determine an area within a first radius of the vehicle V as the first interest area based on the GPS-based initial position information on the vehicle V.

When the first interest area is determined, the vehicle position estimating unit 110 may obtain the initial orientation angle of the camera C by matching a first landmark for a lane marking in the first interest area to the front view image captured by the camera C. Specifically, the vehicle position estimating unit 110 may obtain a rotation matrix R for the initial orientation angle of the camera C according to Equation 1.

$$S^* = \underset{S}{\mathrm{argmin}} \sum \{Z_k - h(T, R, P_k)\}^T \qquad \text{[Equation 1]}$$
$$(C_{Z_k} + HC_{P_k}H^T)^{-1}\{Z_k - h(T, R, P_k)\}$$

Herein, a solution S* of Equation 1 may represent the initial position information including the rotation matrix R for the initial orientation angle of the camera C and a translation matrix T for the initial position of the camera C. $Z_k$ may indicate coordinates of a lane marking detected from the front view image, $P_k$ may indicate coordinates of the landmark on the high definition map corresponding to $Z_k$, and $C_{Zk}$ and $C_{Pk}$ may each indicate the covariance representing an error for $Z_k$ and $P_k$, and H may indicate a partial derivative of a function h( )(a Jacobian matrix). In addition, the function h( ) may indicate a function projecting the coordinates of the landmark on the high definition map onto the front view image, which may be defined according to Equation 2.

$$h(T,R,P)=K(R \times P+T) \qquad \text{[Equation 2]}$$

Herein, T may indicate the translation matrix for the initial position of the camera C, R may indicate the rotation matrix for the initial orientation angle of the camera C, and P may indicate coordinates of the landmark on the high definition map. K may indicate an intrinsic parameter matrix of the camera C for projecting coordinates based on the camera coordinate system into the front view image captured by the camera C.

To obtain the solution S* of Equation 1, the vehicle position estimating unit 110 may select at least one of publicly known algorithms, for example, a Gauss Newton algorithm or a Levenberg-Marquardt algorithm.

In addition, the vehicle position estimating unit 110 may obtain the translation matrix T for the initial position of the camera C by matching a second landmark other than the lane marking to the front view image. Specifically, the vehicle position estimating unit 110 may determine, on the high definition map, a second interest area based on the GPS-based initial position information on the vehicle V. Specifically, the vehicle position estimating unit 110 may determine an area within a second radius greater than or equal to the first radius as the second interest area based on the GPS-based initial position information on the vehicle V. In order to accurately obtain the initial position of the camera C, the initial orientation angle is obtained from the initial position information on the camera C by using the landmark within a wider range.

Next, the vehicle position estimating unit 110 may obtain the initial position of the camera C by matching the second landmark other than the lane marking in the second interest area to the front view image based on the initial orientation angle of the camera C. Specifically, the vehicle position estimating unit 110 may obtain the translation matrix T for the initial position of the camera C by inputting the obtained rotation matrix R for the initial orientation angle of the camera C to Equation 1 to calculate.

At this time, the translation matrix T for a plurality of initial positions of the camera C corresponding to the rotation matrix R for the initial orientation angle of the camera C may be obtained The initial position information including the obtained initial position and the initial orientation angle of the camera C may be used as an input value for estimating the position of the camera C, which will be described.

When the initial position information on the camera C is obtained, the vehicle position estimating unit 110 may obtain the estimated position information on the camera C by using the initial position of the camera C as an input value. First, the vehicle position estimating unit 110 may perform sampling for a plurality of candidate position information around the initial position information on the camera C. Specifically, the vehicle position estimating unit 110 may set the initial position information on the camera C as an average and perform sampling by using a Gaussian probability model in which error modeling is set with a predetermined covariance. At this time, the Gaussian probability model may be defined as a minimum of six dimensions with three degrees of freedom for the orientation angle and three degrees of freedom for the position.

If there is a plurality of the initial position information on the camera C, the vehicle position estimating unit 110 may perform sampling for each initial position information on the camera C according to the Gaussian probability model.

Then, the vehicle position estimating unit 110 may obtain the estimated position information on the camera C by using a particle filter. Specifically, the vehicle position estimating unit 110 may reflect driving information on the vehicle V in a plurality of the candidate position information. At this time, the vehicle position estimating unit 110 may follow Equation 3.

$$\begin{bmatrix} \hat{x}(k+1) \\ \hat{y}(k+1) \\ \hat{\theta}(k+1) \end{bmatrix} = \begin{bmatrix} \hat{x}(k) \\ \hat{y}(k) \\ \hat{\theta}(k) \end{bmatrix} + \begin{bmatrix} \frac{S_r + S_l}{2} \cos\left(\theta + \frac{S_r - S_l}{2b}\right) \\ \frac{S_r + S_l}{2} \sin\left(\theta + \frac{S_r - S_l}{2b}\right) \\ \frac{S_r - S_l}{b} \end{bmatrix}$$ [Equation 3]

Herein, a matrix [x(k); y(k); θ(k)] may indicate the position and a driving direction of the vehicle V at a time k. $S_r$ may indicate a driving distance according to a right wheel speed of the vehicle V, and $S_l$ may indicate a driving distance according to a left wheel speed of the vehicle V.

To this end, the vehicle position estimating unit 110 may receive driving information including wheel speed information and the yaw rate information from the vehicle V.

Then, the vehicle position estimating unit 110 may weight each of the plurality of the candidate position information based on a matching error between the landmark, on the high definition map, corresponding to each of the plurality of the candidate position information and the front view image.

To this end, the vehicle position estimating unit 110 may use the front view image in which the landmark is extracted. At this time, the vehicle position estimating unit 110 may exclude, according to a result of reflection of the driving information, candidate location information off the road or candidate location information on a road in an opposite direction to the driving direction of the vehicle V.

When the first landmark and the second landmark are extracted from the front view image, the vehicle position estimating unit 110 may match the landmark on the high definition map corresponding to each of the plurality of the candidate position information with the front view image. At this time, the vehicle position estimating unit 110 may use Equation 2 for the landmark matching.

The vehicle position estimating unit 110 may check the matching error according to a matching result and obtain a weight corresponding to the matching error. This may follow Equation 4.

$$G_\sigma(\Delta x, \Delta y) = \frac{1}{2\pi\sigma^2} e^{-\left(\frac{\Delta x^2 + \Delta y^2}{2\sigma^2}\right)}$$ [Equation 4]

Herein, $G_\sigma$ may indicate the weight, (Δx, Δy) may indicate an error for x and y in the front view image, and σ may indicate a standard deviation.

Then, the vehicle position estimating unit 110 may reflect the matching error by assigning the corresponding weight to the candidate position information.

After assigning the weight, the vehicle position estimating unit 110 may newly perform sampling for the plurality of the candidate position information by using the plurality of the candidate position information where the weight is assigned. Since the sampling is newly performed based on the weighted result, a plurality of the candidate position information may converge around candidate position information with a small matching error.

When the sampling is completed, the vehicle position estimating unit 110 may check whether the standard deviation of the plurality of the candidate position information where the sampling is newly performed is equal to or less than a reference standard deviation. Herein, the reference standard deviation may indicate a maximum standard deviation capable of obtaining the estimated position information on the camera C by using a plurality of candidate positions.

If the standard deviation of the plurality of the candidate position information newly sampled is equal to or less than the reference standard deviation, the vehicle position estimating unit 110 may obtain an average value of the plurality of the candidate position information newly sampled as the estimated position information on the camera C. On the other hand, if the standard deviation of the plurality of the candidate position information newly sampled is greater than the reference standard deviation, the vehicle position estimating unit 110 may reflect the driving information on the vehicle V in the plurality of the candidate position information newly sampled, and then perform the process described above repeatedly.

When the estimated position information on the camera C is obtained, the vehicle position estimating unit 110 may obtain the estimated position information on the vehicle V based on the estimated position information on the camera C. At this time, the vehicle position estimating unit 110 may obtain the estimated position information on the vehicle V by using the translation matrix T and the rotation matrix R.

Referring to FIG. 1A again, the driving lane information obtaining unit 120 may determine the driving lane of the vehicle V by matching the estimated position of the vehicle V on the high definition map. Further, the driving lane information obtaining unit 120 may determine the lane markings on both sides of the determined driving lane as the first driving lane markings, and obtain first driving lane information.

Furthermore, the driving lane information obtaining unit 120 may identify the driving lane of the vehicle V from the front view image from the vehicle V captured by the camera C. Specifically, the vehicle position estimating unit 110 may determine the driving lane of the vehicle V based on the position where the camera C is installed in the vehicle V. If the camera C is installed at the center between a left side and a right side of the vehicle V, the vehicle position estimating unit 110 may determine a lane where the center of the front view image is positioned as the driving lane of the vehicle V. When the driving lane is determined, the vehicle position estimating unit 110 may determine the lane markings on both sides of the driving lane as the second driving lane markings, and obtain second driving lane information.

When the first driving lane information and the second driving lane information are obtained, the coordinate system converting unit 130 may convert the first driving lane information and the second driving lane information according to the vehicle coordinate system. Specifically, the coordinate system converting unit 130 may convert the first driving lane information and the second driving lane information based on the estimated position information on the vehicle V.

Since the first driving lane information is obtained from the high definition map, the coordinate system of the first driving lane information may follow the reference coordinate system that is the coordinate system of the high definition map. Therefore, the coordinate system converting unit 130 converts the first driving lane information based on the vehicle coordinate system by using the translation matrix determined according to the position and the rotation matrix determined according to the orientation angle in the estimated position information on the vehicle V.

Meanwhile, since the second driving lane information is obtained from the front view image, the second driving lane information may follow the image coordinate system for the front view image. Therefore, the coordinate system converting unit 130 may convert the second driving lane information following the image coordinate system based on the three-dimensional vehicle coordinate system.

To this end, the coordinate system converting unit 130 according to one embodiment may assume the ground on which the driving lane marking exists as a plane, and obtain the second driving lane information in a top view image corresponding to the front view image by using the estimated position information on the vehicle V. Herein, the top view image may indicate an image viewed from a top of the ground assumed to be the plane to the ground in a vertical direction.

The coordinate system converting unit 130 according to one embodiment may obtain the second driving lane information in the top view image according to Equation 5.

$$m_{top\text{-}view}=K_1R_1^{-1}K_1^{-1}m \qquad \text{[Equation 5]}$$

Herein, $m_{top\text{-}view}$ may indicate a result of converting coordinates m in the front view image that follows the image coordinate system to coordinates in the top view image. $K_1$ may indicate an intrinsic parameter matrix (3×3) of the camera C for projecting estimated coordinates based on the camera coordinate system into the front view image captured by the camera C, and $R_1$ may indicate the rotation matrix for the estimated orientation angle of the camera C. The coordinate system converting unit 130 may obtain the second driving lane information in the top view image by inputting the second driving lane information in the front view image into m in Equation 5.

Then, the coordinate system converting unit 130 may convert the second driving lane information in the top view image according to the vehicle coordinate system. Specifically, on a premise that the position where the camera C is installed in the vehicle V is recognized, the coordinate system converting unit 130 may convert the second driving lane information marking in the top view image according to the vehicle coordinate system based on a distance between the second driving lane marking and the vehicle V in the top view image.

Alternatively, the coordinate system converting unit 130 according to another embodiment may convert the second driving lane information according to the vehicle coordinate system by considering a slope of the ground where the driving lane marking exists. Hereinafter, referring to FIGS. 4 and 5, one embodiment in which the second driving lane information is converted according to the vehicle coordinate system considering the slope of the ground where the driving lane marking exists will be described.

Figure 4:
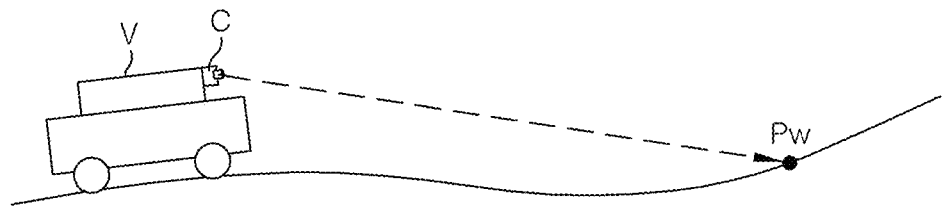
FIG. 4 shows a diagram illustrating a straight line in a driving lane marking direction from a camera according to another embodiment.
Figure 5:
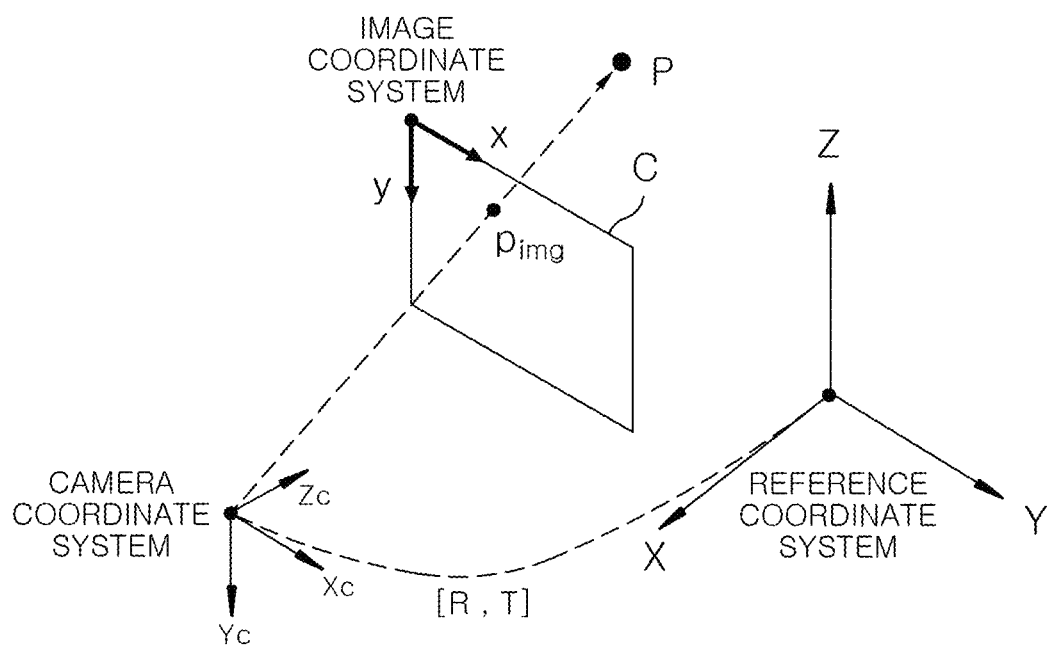
FIG. 5 shows a diagram illustrating that a coordinate system converting unit converts second driving lane information according to a vehicle coordinate system according to another embodiment.
Figure 6:
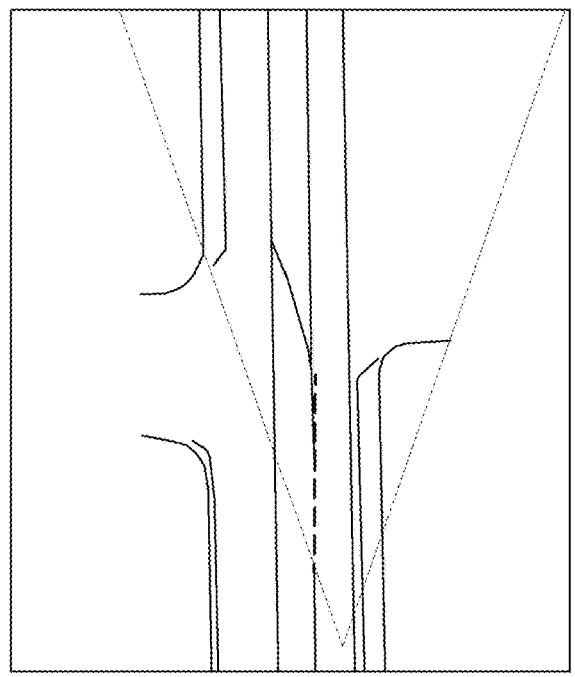
FIG. 6 shows a diagram illustrating a matching result of second driving lane information on a high definition map according to one embodiment.
Figure 7:
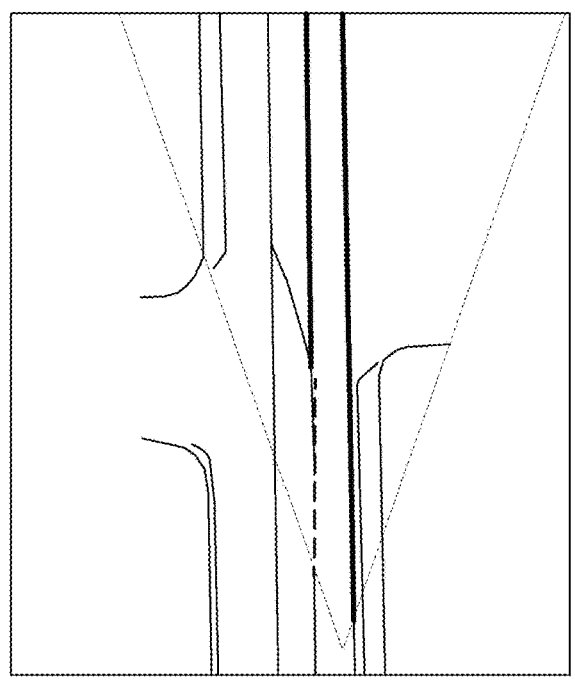
FIG. 7 shows a diagram illustrating a matching result of first driving lane information and second driving lane information on a high definition map according to one embodiment.

FIG. 4 shows a diagram illustrating a straight line in a driving lane marking direction from the camera C according to another embodiment, FIG. 5 shows a diagram illustrating that the coordinate system converting unit 130 converts second driving lane information according to a vehicle coordinate system according to another embodiment, FIG. 6 shows a diagram illustrating a matching result of the second driving lane information on the high definition map according to one embodiment, and FIG. 7 shows a diagram illustrating a matching result of the first driving lane information and the second driving lane information on the high definition map according to one embodiment.

The camera C installed in the vehicle V may obtain a front view image by forming an image of a subject on a straight path from the camera C to the subject. Therefore, the coordinate system converting unit 130 may determine a straight line passing through the camera C and the second driving lane information according to the image coordinate system of the front view image, and obtain a point where the straight line contacts the ground as the second driving lane information that is converted into a reference coordinate system.

At this time, as illustrated in FIG. 4, when the ground is not a plane, the coordinate system converting unit 130 may consider the slope of the ground. Therefore, the coordinate system converting unit 130 may grid surroundings of estimated position information on the camera C on the high definition map into a plurality of planes. Then, the coordinate system converting unit 130 may determine a plane equation of each of the plurality of planes, and the plane equation follows Equation 6.

$$ax+by+cz+d=0 \qquad \text{[Equation 6]}$$

Herein, a, b, c, and d may indicate coefficients of the plane equation. The coordinate system converting unit 130 may obtain the coefficients a, b, c, and d by inputting three-dimensional coordinates (x, y, z) of at least four position information of points each existing on the plane, that is at least four points included in a point cloud into Equation 6. Furthermore, if there is a plane including position information of three or less points within the one plane among the plurality of gridded planes, the coefficients of the plane equation of an adjacent plane including position information of at least four points may be used.

Then, the coordinate system converting unit 130 may obtain a vector directed to the second driving lane information in the front view image from an origin of a camera coordinate system by using the estimated position information on the vehicle V. Referring to FIG. 5, if one pixel $P_{img}$ is in second driving lane markings in the front view image I, the coordinate system converting unit 130 may obtain a vector passing through the $P_{img}$ and the origin of the camera coordinate system. Specifically, the coordinate system converting unit 130 may obtain a vector $P_{ray}$ passing through the $P_{img}$ and the origin of the camera coordinate system according to Equation 7.

$$P_{ray}=R_1^{-1}(K^{-1}m-T_1) \qquad \text{[Equation 7]}$$

Herein, $P_{ray}$ may indicate a vector defined as a matrix $[x,y,z]^T$, $R_1$ may indicate a rotation matrix for an estimated orientation angle of the camera C, K may indicate an intrinsic parameter matrix (3×3) of the camera C for projecting estimated coordinates based on the camera coordinate system into the front view image captured by the camera C, and m may indicate coordinates of $P_{img}$ in the front view image I following the image coordinate system, and $T_1$ may indicate a translation matrix for an estimated position of the camera C.

The obtained $P_{ray}$ may be illustrated as dotted arrows in FIGS. 4 and 5.

When the vector $P_{ray}$ is obtained, the coordinate system converting unit 130 may determine a straight-line equation based on the vector $P_{ray}$, and obtain an intersection point $P_w$ between the determined straight-line equation and the determined plane equation for the plurality of the gridded planes. Since the straight-line equation and the plane equation determined above follow the reference coordinate system, the intersection point $P_w$ may also follow the reference coordinate system.

Therefore, the obtained intersection point $P_w$ may be the second driving lane information according to the reference coordinate system corresponding to $P_{img}$ in the front view image I.

Finally, the coordinate system converting unit 130 may convert, according to the vehicle coordinate system, the second driving lane information accorded to the reference coordinate system based on the estimated position information on the vehicle V. Specifically, the coordinate system converting unit 130 may convert the second driving lane information according to the reference coordinate system by using the translation matrix corresponding to the position and the rotation matrix corresponding to the orientation angle in the estimated position information on the vehicle V.

In FIG. 6, a dotted line indicates the second driving lane information mapped on the high definition map. In FIG. 6, the obtained second driving lane information does not include right driving lane information. As described above, there is a possibility that the second driving lane information obtained through the front view image is different from the actual driving lane. Therefore, the second driving lane information may be combined with the first driving lane information obtained from the high definition map.

Referring to FIG. 7, the dotted line indicates the second driving lane information mapped on the high definition map, and the thick straight lines indicate the first driving lane information obtained from the high definition map. As described above, by combining both driving lane information, more accurate detection of the driving lane marking may be possible.

Referring to FIG. 1A again, the lane combining unit 140 may obtain the final driving lane information by combining the first driving lane information and the second driving lane information converted according to at least one of the vehicle coordinate system and the image coordinate system. Hereinafter, referring to FIGS. 8A, 8B, 8C, 8D, 8E, 8F, and 8G, a method of combining the first driving lane information and the second driving lane information converted according to at least one of the vehicle coordinate system and the image coordinate system will be described in detail.

FIGS. 8A to 8G show diagrams illustrating an operation of the lane combining unit 140 according to one embodiment. A dotted line indicates second driving lane information converted according to a vehicle coordinate system, and thick straight lines indicate the first driving lane information converted according to the vehicle coordinate system.

Figure 8A:
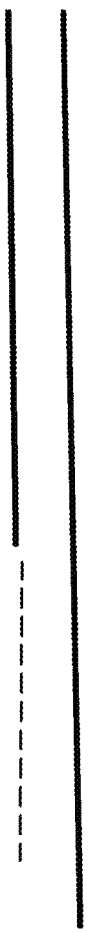
FIGS. 8A, 8B, 8C, 8D, 8E, 8F and 8G show a diagram illustrating an operation of a lane combining unit according to one embodiment.
Figure 8B:
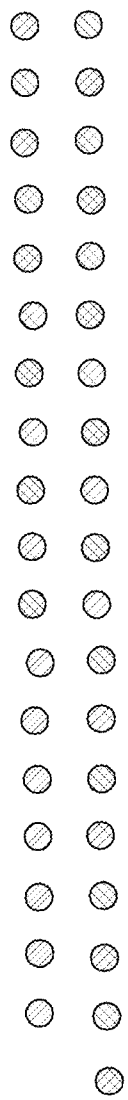
Figure 8C:
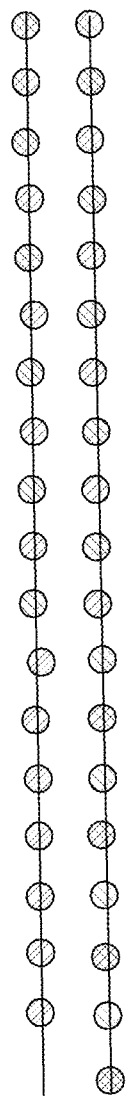

Hereinafter, referring to FIGS. 8A, 8B, and 8C, a method of obtaining final driving lane information based on the first driving lane information and the second driving lane information converted according to the vehicle coordinate system will be described. Referring to FIGS. 8A, 8B, and 8C, the lane combining unit 140 according to one embodiment may obtain the final driving lane information by combining the first driving lane information and the second driving lane information converted according to the vehicle coordinate system. To this end, first, the lane combining unit 140 may identify an overlapping area of the first driving lane information and the second driving lane information converted according to the vehicle coordinate system. When the overlapping area is identified, the lane combining unit 140 according to one embodiment may obtain combined driving lane information by selecting, for the overlapping area, one of the first driving lane information and the second driving lane information converted according to the vehicle coordinate system.

For example, the lane combining unit 140 may select the second driving lane information in an overlapping area within a reference distance from the vehicle V, and select the first driving lane information in an overlapping area outside the reference distance. At this time, the reference distance may indicate a maximum distance in which reliability of the front view image is higher than that of the high definition map.

Typically, the front view image tends to have high accuracy for a short-distance area, while having low accuracy for a long-distance area. Therefore, the lane combining unit 140 may select the second driving lane information converted according to the vehicle coordinate system in the short-distance area determined according to the reference distance, and select the first lane information converted according to the vehicle coordinate system in the long-distance area determined according to the reference distance.

On the other hand, the lane combining unit 140 according to another embodiment may obtain, for the overlapping area, combined driving lane information including both the first driving lane information and the second driving lane information converted according to the vehicle coordinate system.

FIG. 8A illustrates the combined driving lane information obtained by the lane combining unit 140. When the combined driving lane information is obtained, the lane combining unit 140 may perform sampling for the combined driving lane information at predetermined intervals. FIG. 8B illustrates sampled combined driving lane information.

Next, the lane combining unit 140 may obtain the final driving lane information by performing fitting for the sampled combined driving lane information with a polynomial function. At this time, the lane combining unit 140 may perform curve fitting for the sampled combined driving lane information, which follows Equation 8.

$$y=ax^3+bx^2+cx+d \qquad \text{[Equation 8]}$$

The lane combining unit 140 may obtain one straight line or one curve as a final driving lane marking by performing regression analysis of the sampled combined driving lane information with respect to Equation 8 described above. The straight lines connecting points illustrated in FIG. 8c indicate the obtained final driving lane markings.

In addition, the lane combining unit 140 may obtain, from the coefficient a of the polynomial function obtained as the final driving lane marking, the final driving lane information including a derivative value of curvature, the curvature, a direction value, and an offset value of the final driving lane marking. Specifically, the lane combining unit 140 may obtain 6a as the derivative value of the curvature of the final driving lane marking, 2b as the curvature, arctan(c) as the direction value, and d as the offset value.

Alternatively, the lane combining unit 140 according to another embodiment may obtain the final driving lane information by combining the first driving lane information converted according to the image coordinate system and the second driving lane information. Hereinafter, referring to FIGS. 8D, 8E, 8F, and 8G, a method of obtaining final driving lane information by combining the first driving lane information converted according to the image coordinate system and the second driving lane information will be described.

Figure 8D:
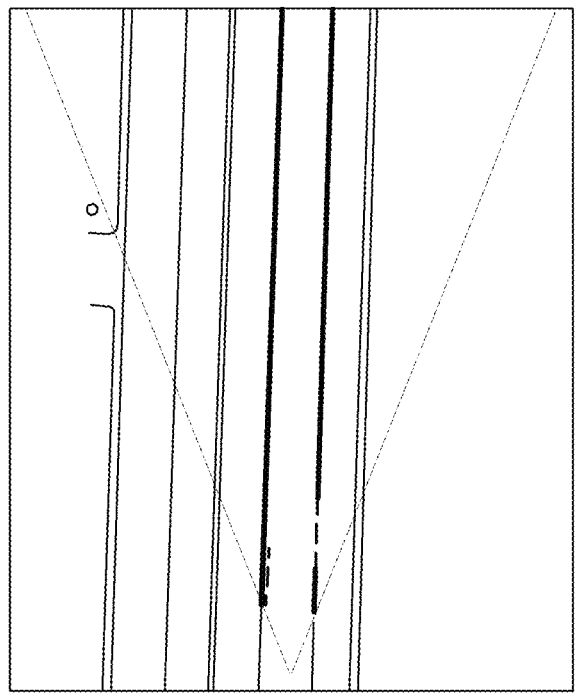

Referring to FIG. 8D, the obtained second driving lane information may include part of driving lane information for the short-distance area. That is, the second driving lane information obtained through the front view image may not include driving lane information for the long-distance area due to surrounding vehicles or the like. To solve this, the lane combining unit 140 according to another embodiment may convert the first driving lane information obtained from the high definition map according to the image coordinate system, and obtain the final driving lane information by combining the converted first driving lane information with the second driving lane information.

To this end, the coordinate system converting unit 130 may convert the first driving lane information on the high definition map to the image coordinate system by using estimated position information on the vehicle V. Specifically, the coordinate system converting unit 130 may obtain, according to Equation 9, m' converted from a point $P_w$ for a three-dimensional lane marking on the high definition map according to the image coordinate system for the front view image.

$$m' = K(R_1 P_w + T_1) \quad \text{[Equation 9]}$$

Herein, m' may indicate a point which is converted from the point $P_w$ for the three-dimensional lane marking on the high definition map according to the image coordinate system. K may indicate an intrinsic parameter matrix (3×3) of the camera C for projecting estimated coordinates into the front view image captured by the camera C, $R_1$ may indicate a rotation matrix for an estimated orientation angle of the camera C, and $T_1$ may indicate a translation matrix for an estimated position of the camera C.

Figure 8E:
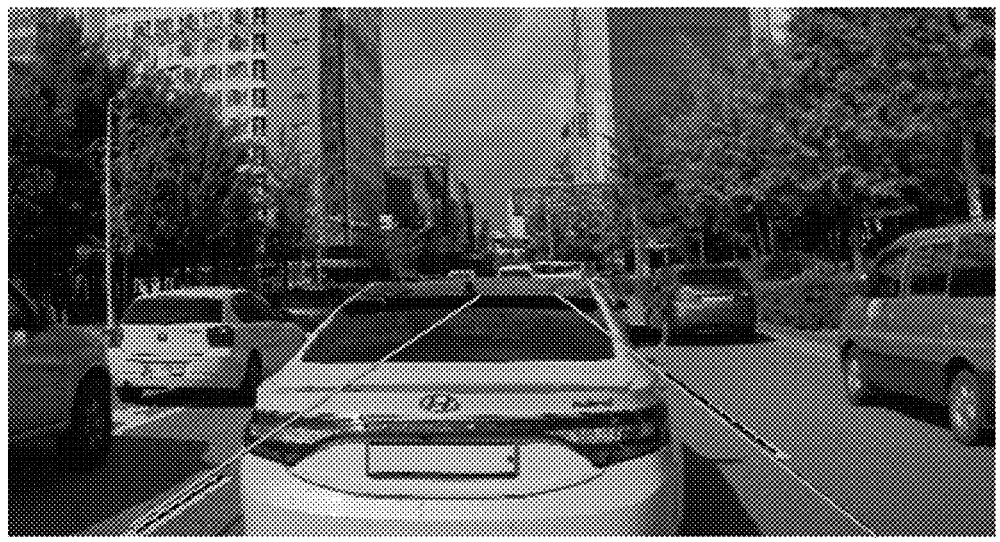

By converting the first driving lane information according to the image coordinate system through the above-described process and mapping the converted first driving lane information on the front view image, the lane combining unit 140 may obtain the combined driving lane information that the first driving lane information converted according to the image coordinate system and the second driving lane information are combined in the front view image. FIG. 8E illustrates the obtained combined driving lane information in an actual front view image.

At this time, the lane combining unit 140 may obtain, for the overlapping area, the combined driving lane information including both the first driving lane information converted according to the image coordinate system and the second driving lane information detected from the front view image. Otherwise, the lane combining unit 140 may use, for the overlapping area, one of the first driving lane information and the second driving lane information.

Further, in general, the front view image tends to have high accuracy for the short-distance area, while the accuracy for the long-distance area tends to be low. Considering the tendency, the lane combining unit 140 may select the second driving lane information detected from the front view image in the short-distance area determined according to the reference distance, and select the first driving lane information converted according to the image coordinate system in the long-distance area determined according to the reference distance.

Figure 8F:
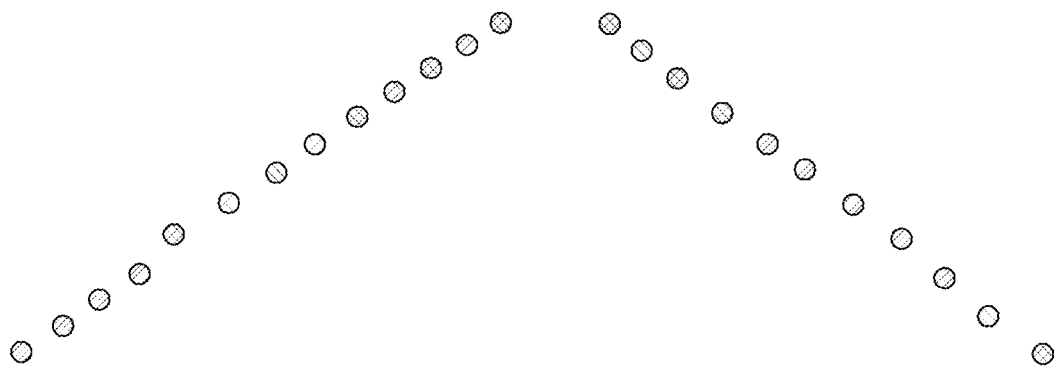
Figure 8G:
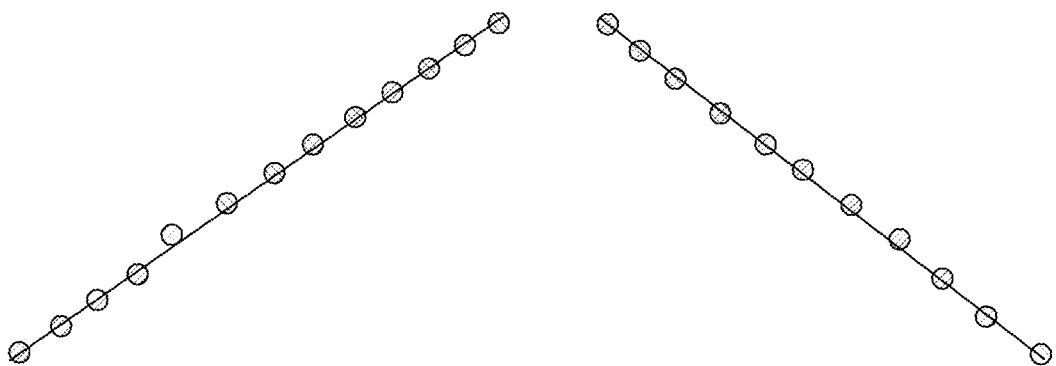

After obtaining the combined driving lane information, the lane combining unit 140 may obtain one straight line or curve as the final driving lane information by performing the regression analysis of the sampled combined driving lane information with respect to Equation 8 described above. If combined driving lane information as illustrated in FIG. 8F is obtained, the lane combining unit 140 may obtain the final driving lane information such as straight lines in FIG. 8G.

Further, the lane combining unit 140 may perform resampling for the final driving lane information obtained by the regression analysis in the image coordinate system and obtain a vector $P_{ray}$ passing through an origin of the camera coordinate system according to Equation 7. The lane combining unit 140 may determine a straight-line equation based on the $P_{ray}$, and obtain an intersection point P between the determined straight-line equation and a plane equation for the plurality of gridded planes. The obtained intersection point $P_w$ may be information obtained by converting, according to the reference coordinate system, the combined driving lane information that is combined by the regression analysis based on the image coordinate system.

Finally, the coordinate system converting unit 130 may convert, according to the vehicle coordinate system, the combined driving lane information accorded to the reference coordinate system based on the estimated position information on the vehicle V. Specifically, the coordinate system converting unit 130 may convert the combined lane information according to the reference coordinate system by using the translation matrix corresponding to the position and the rotation matrix corresponding to the orientation angle in the estimated position information on the vehicle V.

Since an advanced driver assistance system (for example, a lane departure warning system, a lane keeping assist system, etc.) mounted on the vehicle V has a value that follows the vehicle coordinate system as an input value, the lane information detecting apparatus 100 described above may provide an environment for more precise control over the vehicle V by providing the final driving lane information according to the vehicle coordinate system to the advanced driver assistance system.

Figure 9:
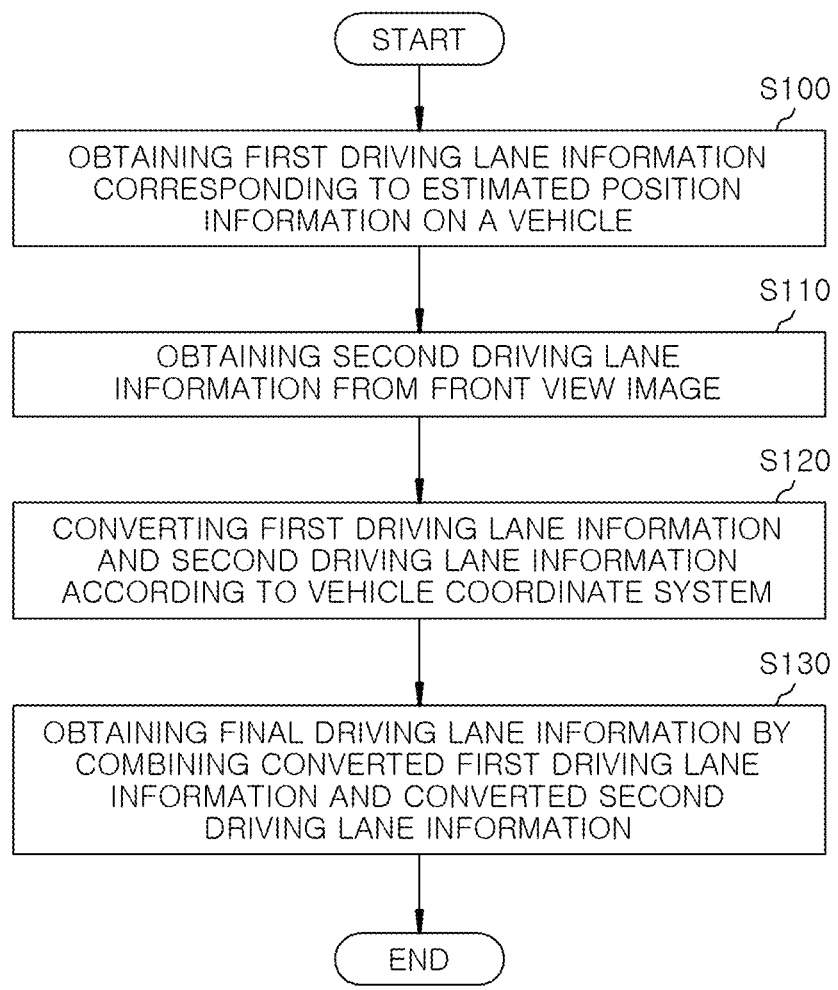
FIG. 9 shows a flowchart illustrating a lane information detecting method according to one embodiment.

FIG. 9 shows a flowchart illustrating a lane information detecting method according to one embodiment.

First, in a step S100, the lane information detecting apparatus 100 may obtain, from a high definition map, first driving lane information corresponding to an estimated position information on the camera C installed in the vehicle V. To this end, the lane information detecting apparatus 100 may obtain estimated position information on the vehicle V by using a GPS-based position of the vehicle V and the high definition map. At this time, the first driving lane information may follow a reference coordinate system that is a coordinate system of the high definition map.

Then, in a step S110, the lane information detecting apparatus 100 may obtain second driving lane information from a front view image captured by the camera C installed in the vehicle V. At this time, the second driving lane information may follow an image coordinate system that is a coordinate system of the front view image.

In a step S120, when the first driving lane information and the second driving lane information are obtained, the lane information detecting apparatus 100 may convert the first driving lane information and the second driving lane information according to a vehicle coordinate system. Specifically, the lane information detecting apparatus 100 may convert the first driving lane information and the second driving lane information by using the estimated position information on the vehicle V.

Finally, in a step S130, the lane information detecting apparatus 100 may obtain final driving lane information by combining the converted first driving lane information and the converted second driving lane information. Specifically, the lane information detecting apparatus 100 may combine the converted first driving lane information and the converted second driving lane information selectively or altogether, and perform fitting for the combined result to obtain the final driving lane information.

The lane information detecting apparatus and the lane information detecting method described above, and a computer-readable recording medium storing a computer program programmed to execute the lane information detecting method may detect more accurate driving lane information by using the high definition map as well as the front view image of the vehicle.

Further, by using the detected driving lane information as input values of the lane departure warning system and the lane keeping assist system, more precise control over the vehicle may be possible.

On the other hand, each of the step included in the lane information detecting method according to one embodiment described above may be implemented in the computer-readable recording medium including the computer program programmed to execute each of the steps.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

According to one embodiment, the above-described lane information detecting apparatus, the lane information detecting method, and the computer-readable recording medium storing the computer program programmed to perform the lane information detecting method may be used in various fields such as a home or an industrial site, and thus have industrial applicability

What is claimed is:

1. A lane information detecting method comprising:
obtaining, from a high definition map, first driving lane information corresponding to estimated position information on a vehicle;
obtaining second driving lane information from a front view image from the vehicle captured by a camera installed in the vehicle;
converting the first driving lane information and the second driving lane information according to an identical coordinate system; and
obtaining final driving lane information by combining the converted first driving lane information and the converted second driving lane information.

2. The method of claim 1, wherein obtaining the first driving lane information from the high definition map includes:
obtaining estimated position information on the camera based on a matching error between a landmark in the high definition map corresponding to each of a plurality of candidate position information sampled based on an initial position of the camera and the front view image;
obtaining the estimated position information on the vehicle based on estimated position information on the camera;
determining a driving lane of the vehicle based on the estimated position information on the vehicle; and
obtaining, from the high definition map, the first driving lane information on both sides of the determined driving lane.

3. The method of claim 1, wherein the first driving lane information is obtained based on a reference coordinate system, and the second driving lane information is obtained based on an image coordinate system for the front view image.

4. The method of claim 1, wherein converting the first driving lane information and the second driving lane information according to the identical coordinate system is converting the first driving lane information and the second driving lane information according to a vehicle coordinate system by using the estimated position information on the vehicle.

5. The method of claim 4, wherein converting the second driving lane information according to the vehicle coordinate system includes:
obtaining the second driving lane information in a top view image corresponding to the front view image based on the estimated position information on the vehicle; and
converting the second driving lane information in the top view image according to the vehicle coordinate system.

6. The method of claim 4, wherein converting the second driving lane information according to the vehicle coordinate system includes:
gridding surroundings of estimated position information on the camera on the high definition map into a plurality of planes;
obtaining a vector directed to the second driving lane information in the front view image from an origin of a camera coordinate system by using the estimated position information on the vehicle;
obtaining, based on a straight line determined from the obtained vector and the plurality of the gridded planes, the second driving lane information according to a reference coordinate system; and
converting, based on the estimated position information on the vehicle, the second driving lane information according to the reference coordinate system into the second driving lane information according to the vehicle coordinate system.

7. The method of claim 6,
wherein a plane is classified into a first plane group when position information of four or more points within one plane are obtainable, and is classified into a second plane group when the position information of three or less points within the one plane are obtainable, and wherein gridding the surroundings of the estimated position information on the camera on the high definition map into the plurality of the planes includes:

determining a plane equation for a first plane in the first plane group based on position information of four or more points on the first plane; and determining a plane equation for a second plane in the second plane group based on a plane equation of a plane which belongs to the first group and adjacent to the second plane.

8. The method of claim 4, wherein obtaining the final driving lane information includes:

obtaining combined driving lane information by combining the converted first driving lane information and the converted second driving lane information;

performing sampling for the obtained combined driving lane information; and obtaining the final driving lane information by performing fitting for the sampled combined driving lane information with a polynomial function.

9. The method of claim 8, wherein obtaining the combined driving lane information includes:

identifying an overlapping area of the converted first driving lane information and the converted second driving lane information; and obtaining the combined driving lane information based on the estimated position information on the vehicle by selecting, in the overlapping area, one of the converted first driving lane information and the converted second driving lane information.

10. The method of claim 1, wherein converting the first driving lane information and the second driving lane information according to the identical coordinate system is converting the first driving lane information according to an image coordinate system for the front view image.

11. The method of claim 10, wherein obtaining the final driving lane information includes:

mapping the first driving lane information converted according to the image coordinate system on the front view image;

identifying an overlapping area of the first driving lane information and the second driving lane information in the front view image;

obtaining combined driving lane information by selecting, for the overlapping area, one of the first driving lane information and the second driving lane information based on a reference distance; and obtaining the final driving lane information by performing fitting for the combined driving lane information.

12. A non-transitory computer-readable recording medium storing instructions, when executed by a processor to cause the processor to perform a lane information detecting method, the method comprising:

obtaining, from a high definition map, first driving lane information corresponding to estimated position information on a vehicle;

obtaining second driving lane information from a front view image from the vehicle captured by a camera mounted in the vehicle;

converting the first driving lane information and the second driving lane information according to an identical coordinate system; and obtaining final driving lane information by combining the converted first driving lane information and the converted second driving lane information.

13. The recording medium of claim 12, wherein obtaining the first driving lane information from the high definition map includes:

obtaining estimated position information on the camera based on a matching error between a landmark in the high definition map corresponding to each of a plurality of candidate position information sampled based on an initial position of the camera and the front view image;

obtaining the estimated position information on the vehicle based on estimated position information on the camera;

determining a driving lane of the vehicle based on the estimated position information on the vehicle; and obtaining, from the high definition map, the first driving lane information on both sides of the determined driving lane.

14. The recording medium of claim 12, wherein the first driving lane information is obtained based on a reference coordinate system, and the second driving lane information is obtained based on an image coordinate system for the front view image.

15. The recording medium of claim 12, wherein converting the first driving lane information and the second driving lane information according to the identical coordinate system is converting the first driving lane information and the second driving lane information according to a vehicle coordinate system by using the estimated position information on the vehicle.

16. The recording medium of claim 15, wherein converting the second driving lane information according to the vehicle coordinate system includes:

obtaining the second driving lane information in a top view image corresponding to the front view image based on the estimated position information on the vehicle; and converting the second driving lane information in the top view image according to the vehicle coordinate system.

17. The recording medium of claim 15, wherein converting the second driving lane information according to the vehicle coordinate system includes:

gridding surroundings of estimated position information on the camera on the high definition map into a plurality of planes;

obtaining a vector directed to the second driving lane information in the front view image from an origin of a camera coordinate system by using the estimated position information on the vehicle;

obtaining, based on a straight line determined from the obtained vector and the plurality of the gridded planes, the second driving lane information according to a reference coordinate system; and converting, based on the estimated position information on the vehicle, the second driving lane information according to the reference coordinate system into the second driving lane information according to the vehicle coordinate system.

18. The recording medium of claim 17, wherein a plane is classified into a first plane group when position information of four or more points within one plane are obtainable, and is classified into a second plane group when the position information of three or less points within the one plane are obtainable, and wherein gridding the surroundings of the estimated position information on the camera on the high definition map into the plurality of the planes includes:

determining a plane equation for a first plane in the first plane group based on position information of four or more points on the first plane; and determining a plane equation for a second plane in the second plane group based on a plane equation of a plane which belongs to the first group and adjacent to the second plane.

19. The recording medium of claim 15, wherein obtaining the final driving lane information includes:

obtaining combined driving lane information by combining the converted first driving lane information and the converted second driving lane information;

performing sampling for the obtained combined driving lane information; and obtaining the final driving lane information by performing fitting for the sampled combined driving lane information with a polynomial function.

20. A lane information detecting apparatus comprising:

a driving lane information obtaining unit configured to obtain, from a high definition map, first driving lane information corresponding to estimated position information on a vehicle, and obtain second driving lane information from a front view image from the vehicle captured by a camera installed in the vehicle;

a coordinate system converting unit configured to convert the first driving lane information and the second driving lane information according to an identical coordinate system; and a lane combining unit configured to obtain final driving lane information by combining the converted first driving lane information and the converted second driving lane information.

* * * * *